June 17 1924.
H. G. SLINGLUFF
PROCESS OF FLATTENING GLASS SHEETS
Filed Feb. 26, 1923
1,497,798
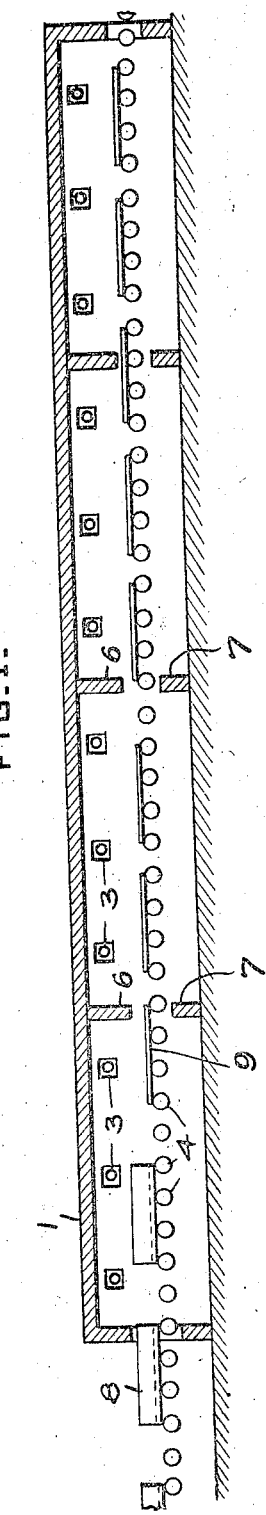
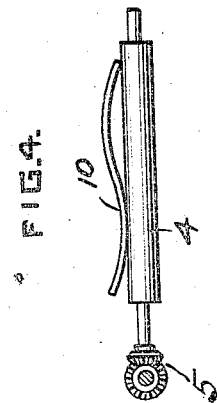
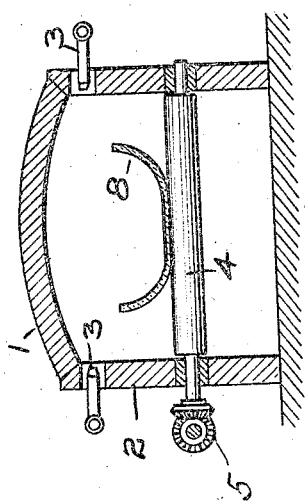
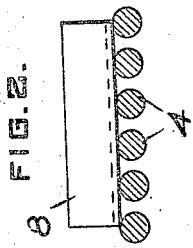
INVENTOR
H. G. Slingluff.
by
James C. Bradley
atty Patented June 17, 1924.

1,497,798

UNITED STATES PATENT OFFICE.

HARRY G. SLINGLUFF, OF MOUNT VERNON, OHIO, ASSIGNOR TO PITTSBURGH PLATE GLASS COMPANY, A CORPORATION OF PENNSYLVANIA.

PROCESS OF FLATTENING GLASS SHEETS.

Application filed February 26, 1923. Serial No. 621,182.

*To all whom it may concern:*

Be it known that I, HARRY G. SLINGLUFF, a citizen of the United States, and a resident of Mount Vernon, in the county of Knox and State of Ohio, have made a new and useful invention in Improvements in Processes of Flattening Glass Sheets, of which the following is a specification.

The invention relates to a process for flattening glass sheets, such as are formed by drawing glass in cylinders and splitting such cylinders into two sections and such as are formed in a continuously operating sheet glass machine in which the glass is drawn in an approximately flat form, but with sufficient departure from a true plane to render further flattening desirable. Glass thus produced has fire finished surfaces and any substantial marring of such surfaces in the flattening operation must be avoided.

In the flattening of the semi-cylindrical sections produced by the cylinder operation, it has been the practice to transfer the sections to a flattening oven having a flattening stone mounted to rotate in horizontal plane upon which the sections are placed with the convex surfaces down. The heat applied to the oven is such as to soften the sections and they are smoothed down or flattened upon the stones by means of a flattening tool in the hands of an operator. The flattening of the glass in this way involves a very considerable item of expense because of the hand labor, and the surface of the glass next to the stone is often marred to a slight extent. It is the purpose of the present invention to avoid this objection as to marring and to avoid the expense of the hand labor in flattening. The process is also equally applicable to the flattening of the sheets produced in a sheet machine in which the glass is drawn in flat form. The glass as produced in a machine of this sort, such as shown in my application, Serial No. 513,677, is approximately flat and in the large number of cases is flat enough for glazing purposes, but it is desirable that a uniform flatness of all sheets should be secured and the present process has been found suitable for securing the necessary flattening at a small expense and with a very slight amount of breakage and with no substantial marring of the glass surface.

Briefly stated the process is carried out by the use of a tunnel kiln provided with carrying or transporting means for the glass in the form of a series of spaced rollers arranged so that the glass may be fed into one end of the kiln and flattened during its progress therethrough on the rollers. The heat applied at the entrance end of the kiln is sufficient to soften the glass so that it settles down by its own weight and flattens upon the rollers. Due to the fact that the rollers are rotating and constantly changing their lines of contact with the glass surface, there is no substantial marring of the surface next to the rolls, although an excess of temperature at this portion of the kiln would cause such marring and cause the sheets to sag between the rollers. The temperatures in the succeeding portions of the kiln become less and less so that the glass in its travel through the kiln gradually hardens and anneals, and finally passes from the outlet end of the kiln at a temperature at which it can be readily handled. The apparatus for carrying out the invention, as above described, is illustrated in diagrammatic form in the accompanying drawings wherein:

Figure 1 is a longitudinal section through a kiln in which the process is being carried out; Figs. 2 and 3 are side and end elevations on an enlarged scale of a cylinder section in position to be flattened upon the rolls of the kiln; and Fig. 4 is an end elevation showing a sheet from a sheet machine in position to be flattened upon the rolls of the kiln, the curvature in such sheet being exaggerated.

Referring to the drawings, 1 is the arch of the kiln, preferably curved as indicated in Fig. 3 and 2 are the side walls provided with suitable openings for gas burners 3 by means of which the necessary heat may be secured. 4 are a series of rollers mounted transversely of the kiln and driven by suitable gearing 5 (Fig. 3) located outside the kiln. The rolls are preferably about 4″ in diameter and spaced on 8″ centers. They may be made of materials specially designed to avoid marring the glass, such as nichrome or nickel or may be provided with carbon surfaces, but preferably they are of cast iron having their surfaces white washed or covered with a film of rust, as this is a relatively cheap construction and one which satisfactorily avoids marring when proper temperature conditions are observed in the kiln.

The kiln is shown as formed in four sections by means of the sub-divisions 6 and 7, and a total length of 45 or 50 feet is sufficient to secure proper flattening and annealing and permit of a reduction of temperature at the outlet end such that the sheets may be easily handled as they emerge. A satisfactory temperature for the first section of the kiln has been found to be about 1440° F. and the temperatures in the succeeding sections are successively lower, tapering down to about 200° F. in the last section. In flattening the cylinder sections 8, as indicated at the left hand end of the kiln, these sections are placed upon the rolls 4 with their convex sides down as indicated at Fig. 3. As the sections are fed along the rolls in the first compartment of the kiln, they quickly become heated to a temperature such that they lose their rigidity and settle down of their own weight substantially flat as indicated at 9. The constantly changing lines of contact between the glass and the rolls, however, prevents any substantial marring of the polished surface, and from the point of emergence into the second chamber of the kiln, the temperature is gradually reduced so that the sheet sets and remains in almost perfectly flat condition throughout its travel through the kiln, its temperature on emergence depending upon the length of the kiln employed and other conditions, but preferably being in the neighborhood of 200° F.

In applying the process to sheets as formed in a sheet machine, and having a relatively slight amount of curvature, the procedure and temperatures employed are the same, the sheets being placed upon the rolls at the left hand end of the kiln and fed through the kiln as heretofore described. Upon the application of heat in the first chamber of the kiln, the sheet 10 may in many cases warp very considerably as indicated in an exaggerated form in Fig. 4, but this warping apparently imposes very little breaking strain upon the glass, as the breakage in carrying out the process is substantially negligible and the sheet soon reaches a temperature at which it is sufficiently plastic to flatten itself upon the rolls. If there is any sagging of the sheet between the rolls when it is at its maximum temperature, such sagging disappears as the sheet progresses along the rolls into an area of lower temperature and it finally sets in a very flat condition. If the sheet is not perfectly annealed when it enters the kiln, it will become so annealed during its passage therethrough.

What I claim is:

1. A process of flattening sheets of glass having polished surfaces and a curvature which it is desired to remove and in which the glass has a temperature below that at which it sets, which consists in moving the sheets continuously ahead in a heated chamber on spaced rotating supports to continuously shift the line of contact between the supports and the sheets, exposing the sheets to a temperature such as to cause them to soften and flatten of their own weight upon the supports but not sufficient to cause any substantial marring of the polished surfaces along the constantly shifting lines of contact with the supports, and then exposing the sheets to progressively decreasing temperatures to permit them to harden and anneal as they move farther along.

2. A process of flattening sheets of glass having polished surfaces and a curvature which it is desired to remove and in which the glass has a temperature below that at which it sets, which consists in moving the sheets continuously ahead in a heated chamber on constantly shifting points of support, exposing the sheets to a temperature such as to cause them to flatten of their own weight, and then exposing the sheets to progressively decreasing temperatures to permit them to set as they move along.

3. A process of flattening curved sheets of glass having a temperature below the setting point and having polished surfaces which consists in conveying the sheets through a tunnel kiln having its highest temperature at the entrance end and gradually decreasing as the outlet end is approached and supporting the sheets upon rotating rolls, with the temperatures in the kiln adjusted in the entrance portion of the kiln so that the sheet flattens of its own weight but does not mar along the constantly shifting lines of contact with the rotating supports.

In testimony whereof, I have hereunto subscribed my name this 29th day of Jany. 1923.

HARRY G. SLINGLUFF.